United States Patent [19]

Hipp

[11] 4,348,939
[45] Sep. 14, 1982

[54] MECHANICAL-OPTOELECTRONIC ANGLE COMPARATOR FOR DETERMINATION OF THE ANGULAR POSITION OF A WEAPON MOUNTED BY A COMBAT VEHICLE RELATIVE TO THE LINE OF SIGHT

[75] Inventor: Johann F. Hipp, Hamburg, Fed. Rep. of Germany

[73] Assignee: Wegman & Co., Kassel, Fed. Rep. of Germany

[21] Appl. No.: 164,108

[22] Filed: Jun. 30, 1980

[30] Foreign Application Priority Data

Jul. 4, 1979 [DE] Fed. Rep. of Germany ....... 2927037

[51] Int. Cl.³ ............................................... F41G 1/30
[52] U.S. Cl. ........................... 89/41 ME; 250/231 SE; 356/152
[58] Field of Search ............... 89/41 E, 41 L, 41 ME; 250/231 SE; 356/152

[56] References Cited

U.S. PATENT DOCUMENTS 4,020,739  5/1977  Piotrowski et al. ................. 89/41 L
4,193,334  3/1980  Jackson ................................ 89/41 E Primary Examiner—Stephen C. Bentley
Attorney, Agent, or Firm—Sprung, Horn, Kramer & Woods

[57] ABSTRACT

A mechanical optoelectric angle comparator for determining the angular position relative to the line of sight of a weapon mounted on a combat vehicle having a sighting device including an objective mirror which pivots on a first axis that is parallel to the axis of rotation of the weapon, is provided with a mechanism for mechanically transmitting the angular position of the weapon.

6 Claims, 2 Drawing Figures

MECHANICAL-OPTOELECTRONIC ANGLE COMPARATOR FOR DETERMINATION OF THE ANGULAR POSITION OF A WEAPON MOUNTED BY A COMBAT VEHICLE RELATIVE TO THE LINE OF SIGHT

BACKGROUND OF THE INVENTION

The invention relates to a mechanical-optoelectronic angle comparator for determination of the angular position of a weapon mounted on a combat vehicle relative to the line of sight. Determination of that angular position with a high degree of accuracy is of importance especially when the line of sight is primarily stabilized, as is the case with modern fighting tanks, and the weapon is made to track the line of sight, in other words, when the position of the axis of rotation of the objective mirror of the sighting device is not mechanically coupled directly to the position of the weapon.

It is known to determine and compare the angular positions of the weapon and of the line of sight in combat vehicles by purely mechanical means, such as linkages, appropriate disk cams being provided between the linkages for control of the ballistic angle of elevation.

It is further known to determine and compare the angular positions of the weapon and of the sight in modern combat vehicles by means of synchro systems and to add the angles of elevation by analog techniques. The associated computers usually operate on an analog basis. However, it has also become known to convert the analog signals of the synchro systems for digital processing in computers.

The drawbacks of the arrangements mentioned, which are purely mechanical, is that wear and distortion due to thermal stresses result in inaccuracies which adversely affect the accuracy of fire. Especially in firing from a fast-moving vehicle, the purely mechanical systems are susceptible to vibrations which render aiming difficult or even impossible.

While the mentioned electronic systems incorporating synchros are less subject to vibrations and wear, analog signal processing in practice entails considerable difficulties since the voltage differences associated with the angle differences are in the microvolt region. In addition, the synchros must be mounted on the axis of rotation of the weapon, which is exposed to considerable mechanical stresses. Besides, this mounting location is not readily accessible.

The known arrangements are unsatisfactory also with respect to the measuring method since they measure the absolute angular position of the weapon rather than its angular position relative to the line of sight. Yet only the relative angle difference between weapon and line of sight is of significance in the use of the weapon system. The formation of the difference angle which the known arrangements thus require is apt to introduce additional errors.

Further inaccuracies, which often are additive, are due to the cable connections required with fire-control systems, environmental influences, and other interfering factors.

Besides, the known systems are complex and vulnerable to interfering electromagnetic fields. An enemy might conceivably take advantage of this weakness of fire-control systems by employing special directional-radio jamming techniques.

SUMMARY OF THE INVENTION

The object of the invention is to provide a mechanical-optoelectronic angle comparator of the type outlined above which eliminates the drawbacks mentioned and which, in particular, measures the angular position of the weapon relative to the line of sight directly and makes possible, through digital acquisition of the measured values, safe signal processing. It is a further object of the invention to implement a system which, while providing at least the same accuracy of measurement as the known arrangements, is of considerably reduced complexity and thus better adapted to the needs of military practice.

In accordance with the invention, these objects are accomplished through the structure according to the invention.

In the angle comparator in accordance with the invention, the angular position of the weapon thus is first transmitted mechanically to the immediate vicinity of the objective mirror in such a way that the difference angle between the weapon and the objective mirror can be determined directly. The beam of light reflected by deflecting mirror undergoes with each rotation about the axis of rotation a deflection corresponding to double the angle of rotation. Now the double-angle variation also corresponds to the particular associated change in the line of sight. The reflected light beam thus represents the position of the line of sight. The sensor field on which the reflected light beam impinges permits the position of the point of impingement, and hence the angular position of the reflected light beam, to be measured precisely. Various advantageous embodiments of the angle comparator in accordance with the invention are possible and form the subject matter disclosed hereinafter.

For example, it is advantageous to use a semiconductor laser diode as a light source for the light projector as well as a high-resolution sensor field whose surface is disposed in the image plane of the projection optics of the light projector.

A positive-sensitive light detector may, in principle, be used as a sensor field.

It has been found particularly advantageous to incorporate in the sensor field a photodiode array, not novel as such, in which the photodiodes are arranged in a row at predetermined intervals. Such high-resolution arrays have an individual-element size as small as a few microns. The arrays are usually implemented in charge-coupled photodiode (CCPD) technique, which permits the measured values to be acquired in digital form.

With larger angular ranges, linear encoder disks with photodiodes of special design are advantageously used.

Moreover, to cover fairly large angular ranges, it may be advantageous to employ a plurality of light projectors whose optical axes are spaced from one another by predetermined fixed angular distances, in which case a signal may be delivered by a coarse angle sensor such as a rotary potentiometer to distinguish the various light projectors. However, a plurality of sensor fields may also be used, each having a light projector associated with it.

The electronic evaluating means may comprise a shift register connector to the photodiodes of the sensor field, the contents of the shift register being cyclically read out and evaluated. The measured values indicating the position of a light spot on the sensor field may then be stored in a register in the electronic evaluating means and appropriately averaged. A required value may be established for the angular position of the weapon relative to the line of sight, and the electronic evaluating means may be connected to control means to provide tracking of the weapon on the basis of the position and motion of the line of sight.

It is further possible to provide positioning elements at the weapon for setting a predetermined angle difference between the position of the weapon and the optical axis of the objective mirror, the position of the weapon being changed until the light beam emanating from the light projector impinges on a predetermined light-sensitive area of the sensor field and a particular angle of elevation is thus established.

Finally, the evaluating means may also control the signal triggering the fire signal.

Summarizing, the use of the angle comparator in accordance with the invention offers the following advantages:

High accuracy of measurement coupled with technical simplicity;

immunity to environmental influences and interface problems through digital acquisition of measured values;

pronounced electromagnetic compatibility through optoelectronic acquisition of measured values;

ease of adaptation to digital signal processing;

simplicity of adjustment by displacement of sensor field;

use of sensor field both as angle-determining means and as required-value transmitter, which permits additional logic elements to be dispensed with.

In the case of combat vehicles, the angle of elevation is fairly small relative to the vertical tilting range of the weapon. A further substantial advantage of the system in accordance with the invention is that the length of the high-resolution sensor field and its distance from the axis of rotation are selected so that the maximum angle of elevation is still within the measurement range; that regardless of the position of the line of sight only the difference angle between the line of sight and the weapon is measured every time; and that when a special photodiode array is used for the sensor field that measured value is available in digital form and can be processed digitally. In this way, highly accurate positioning of the weapon relative to the line of sight is constantly achieved over the full tilting range of the weapon and of the line of sight, respectively.

BRIEF DESCRIPTION OF THE DRAWINGS

An embodiment of an angle comparator in accordance with the invention will now be described in greater detail with reference to the accompanying drawings, wherein.

DETAILED DESCRIPTION OF THE INVENTION

Figure 1:
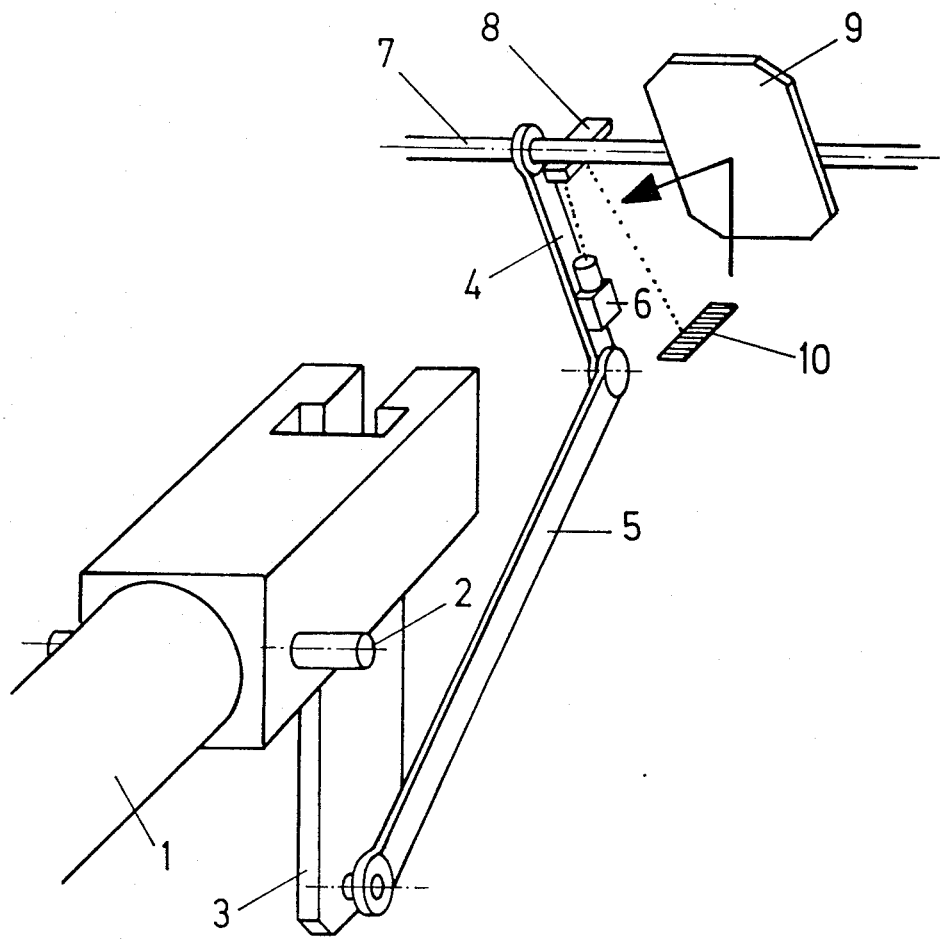
FIG. 1 is a diagrammatic perspective view of an embodiment of the angle comparator.

Shown in FIG. 1 is a gun 1 which pivots on an axis of rotation 2 and may be mounted on a combat vehicle (not shown). Fixed to the gun 1 is a shift lever 3 which through a transmission rod 5 is linked to an intermediate member constructed as a pickup lever 4. The latter pivots on an axis of rotation 7 which is also the pivot of the objective mirror 9 of the gunsight of the combat vehicle. Thus both the pickup lever 4 and the objective mirror 9 pivot on the axis of rotation 7, independently of each other. The length of the transmission rod 5 corresponds to the distance between the axis of rotation 2 of the weapon 1 and the axis of rotation 7 of the objective mirror 9. The two levers 3 and 4 are of equal length. Mounted on the pickup lever 4 is a light projector 6 whose optical axis is perpendicular to the axis of rotation 7. A deflecting mirror 8 is rigidly connected with the objective mirror 9 and disposed so that it is pivotable about the axis of rotation 7 together with the objective mirror 9. The light beam emanating from the light projector 6 impinges on the reflecting surface of the deflecting mirror 8 and is reflected in the direction of a sensor field 10 which is disposed on the vehicle and is adjustable in its longitudinal direction. The sensor field 10 thus is located in the plane which extends from the optical plane of the light projector 6 perpendicularly to the axis of rotation 7.

Figure 2:
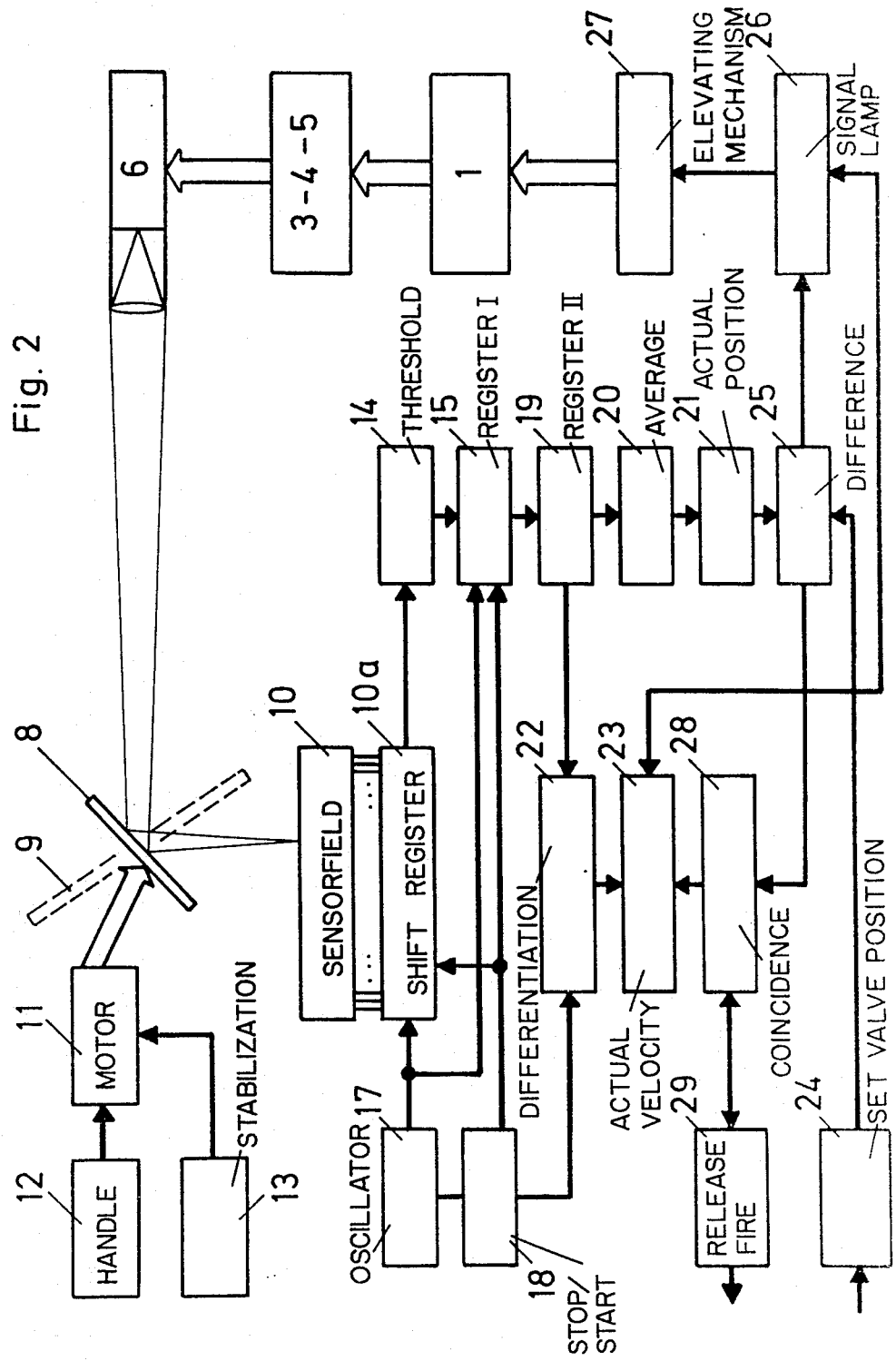
FIG. 2 is a block diagram showing how the angle comparator of FIG. 1 is connected to electronic evaluating means.

The sensor field 10 comprises a photodiode array with a plurality of photodiodes disposed in a row which are connected to electronic evaluating means in a manner apparent from FIG. 2.

The position of the light spot projected onto the surface of the sensor field 10 is a function of the angle difference between the position of the deflecting mirror 8 or of the objective mirror 9, respectively, and the position of the light projector 6 or of the weapon 1, respectively. A particular required value may be set on the sensor field 10 and is indicated in FIG. 1 by an arrow.

The further components of the overall system are shown in FIG. 2. Through a joystick 12 or a stabilizing unit 13, a servomotor 11 is actuated which through the axis of rotation 7 positions the mirrors 8 and 9.

The light beam emanating from the light projector 6 is thus directed to another point on the sensor field 10. The current produced by the photodiodes are received in an analog shift register 10a. The latter, which may be a CCD shift register, is read out cyclically under the control of an oscillator 17. The analog output signal is fed by way of a threshold-value comparator 14 to a first register 15 in which, under the control of the oscillator 17 and of a means for generation of a start/stop signal 18, the position of the light spot on the sensor field 10 is determined. The number of the illuminated photodiode is read into a second register 19. An average value is then formed in unit 20 from the numbers last read in. In this way the actual-position value of the light spot is determined and then retained in unit 21. On the basis of the second register 19, differences between the position values are formed in parallel and stored in unit 22. From the last difference values there is formed in each case in unit 23 an average value which is a measure of the angular velocity of the light beam about the axis of rotation 7.

On the basis of the ballistic parameters a specific required value is arrived at for the angle of elevation of the gun, and that value is converted in unit 24 into a specific position number of the sensor field. In unit 25 the difference between that required-position value and the actual-position value is then formed. The value of the difference formed in unit 25 and the measure for the angular velocity retained in unit 23 are then fed to an electronic signal interface unit 26 and form the basis for actuating signals which are applied to the elevation-setting power system 27. Through the latter, the weapon is appropriately pivoted, and the position of the light projector 6 is varied until the difference value formed and the measure for the angular velocity are within the required tolerances. When both signals are sufficiently small, tracking to the required value has been accomplished. As soon as coincidence has been established in unit 28, a signal is delivered to unit 29 to trigger the fire signal.

With the system described, the stabilizing motions of the objective mirror 9 or the setting motions are always immediately transmitted to the gun in such a way that the desired angle difference between the line of sight and the gun is set. That angle difference may be computed by the use of a fire-control computer on the basis of ballistic parameters. All factors, such as range, type of ammunition, cant, barrel wear, temperature of propellant, outside temperature, air pressure, etc., will enter into such processing to give the correct difference angle. The latter is then entered into the system in the manner described above as the required value. In firing from a moving vehicle in actual combat, the computer will accept the fire pulse but the gun will discharge only when tracking to the required value has been effected in the manner also described above, in other words, when coincidence has been established between the required value of the difference angle and its actual value.

It will be appreciated that the instant specification and claims are set forth by way of illustration and not of limitation, and that various changes and modifications may be made without departing from the spirit and scope of the present invention.

I claim:

1. A mechanical-optoelectronic angle comparator for determining the angular position relative to the line of sight of a weapon mounted on a combat vehicle having a sighting device comprising an objective mirror which pivots on a first axis that is parallel to the axis of rotation of the weapon, the comparator comprising:
   a. means for mechanically transmitting the angular position of the weapon comprising an intermediate member and means mounting same perpendicular to the axis of rotation of the objective mirror for pivotal movement about an axis of rotation coinciding with the first axis of rotation of the objective mirror and independent of the movement of the objective mirror;
   b. at least one deflecting mirror rigidly connected with the objective mirror to dispose the reflecting surface thereof parallel to the first axis of rotation;
   c. at least one light projecting means disposed on the intermediate member and having an optical axis perpendicular to the first axis of rotation of the objective mirror such that the light beam emanating therefrom impinges on the reflecting surface of a deflecting mirror;
   d. at least one electro-optical light sensing means fixed with respect to the first axis and comprising a plurality of aligned light-sensitive regions disposed such that within a predetermined range of angular positions of the intermediate member relative to the deflecting mirror there is at all times at least one light-sensitive region of the sensor field on which the light beam reflected by the deflecting mirror impinges; and
   e. means receptive of the output of the optical sensing means for electronically evaluating the region on which light impinges.

2. An angle comparator according to claim 1, wherein the means for mechanically transmitting the angular position of the weapon comprises a first lever which is fixed to the weapon and pivots on the axis of rotation of the weapon, the intermediate member having the form of a second lever equal in length to the first lever, a transmission rod having a length equal to the distance between the axis of rotation of the weapon and the axis of rotation of the objective mirror and having one end pivotably connected to one end of the first lever and the other end pivotably connected to one end of the second lever.

3. An angle comparator according to claim 1, wherein the light projecting means comprises a semiconductor laser diode the emission structure of said diode being imaged onto the surface of the sensing means by imaging optics.

4. An angle comparator according to claim 1, wherein the sensing means comprises a photodiode array in which the photodiodes are arranged in a row at predetermined intervals, each being connected to the electronic evaluating means.

5. An angle comparator according to claim 4 wherein further comprising a charge coupled device shift rejection connected to the photodiodes to perform the reading-out and evaluating operations cyclically.

6. An angle comparator according to claim 1, further comprising control means connected to the electronic evaluating means to provide tracking of the weapon on the basis of the position and motion of the lines of sight.

* * * * *